United States Patent Office 3,114,827
Patented Dec. 17, 1963

3,114,827
STUD WELDING METHOD AND APPARATUS
Frank K. Kelemen and Ralph K. Ritter, Haddonfield, N.J., assignors to KSM Products, Inc., Merchantville, N.J., a corporation of New Jersey
Filed Feb. 3, 1960, Ser. No. 6,456
22 Claims. (Cl. 219—99)

This invention relates to electric arc stud welding and particularly to novel and improved methods of capacitor-discharge stud welding and apparatus useful for performing said methods.

In the form of electric arc stud welding known as capacitor-discharge welding, a surge of current of high value is passed through the stud and the workpiece to which the stud is to be welded for producing what is termed an "arc" between the stud and workpiece for melting adjoining portions thereof. This surge of current of high value is usually obtained by connecting the stud and workpiece across a capacitor, this being about the simplest and most efficient way to provide the necessary high value current surge; and it is from this that the process derives its descriptive name. The stud, as a rule, is held in contact with the workpiece while a capacitor is discharged therethrough and, in order to obtain sufficiently high resistance between the contacting portions of the stud and workpiece to insure initiation of an arc (or sufficiently high current density), for melting adjoining portions of the stud and workpiece, the stud is provided with some type of special projecting tip extending from the weld end of the stud and adapted to make a high-resistance contact with the workpiece and to be dissipated instantaneously when welding current is supplied to the stud.

Heretofore, in methods of this type, many of the operating factors in the welding operation were considered to be critical to the extent that even slight variations from the optimum would materially and adversely affect the quality of the welds. In some applications of this method, creation of the arc must be followed immediately by the delivery of a percussive blow to the stud; in which case, both the timing and force of the blow are critical. As a result, apparatus for welding studs, particularly aluminum studs, by such methods has been complex, expensive and difficult to maintain and operate. Additionally, a stud having a small projection on its end suffers from the obvious disadvantage that such a projection represents an appreciable portion of the cost of the manufacture of the stud, particularly when the shape and dimensions of the projection are critical. The projection is necessarily small and, accordingly, is easily damaged or deformed, making such studs difficult and inconvenient to handle, package and use.

Objects of the invention are: to provide a novel and improved method of capacitor-discharge stud welding characterized by its simplicity and freedom from critical design and operating factors heretofore associated with this type of stud welding; to provide a method of capacitor-discharge stud welding which can utilize studs which do not have special projections or tips for providing initial high-resistance contact between the stud and workpiece; and to provide a method of capacitor-discharge stud welding wherein a low-intensity arc is first created between the stud and workpiece and is extinguished prior to the discharge of a capacitor through said stud and workpiece for raising adjoining portions thereof to a melting temperature.

Another object of the invention is to provide a method of capacitor-discharge stud welding wherein the weld end of the stud is initially positioned in contact with the workpiece, is withdrawn from contact with the workpiece while a low-intensity arc is created, is returned to contact with the workpiece to extinguish the low-intensity arc, and current of high value is then passed through the stud and workpiece for melting adjoining portions thereof while said stud is pressed into contact with the workpiece.

Some of the more important factors which must be considered in the design of a welding supply and control circuit are cost, portability, convenience and reliability. Cost is obviously an important consideration and is determined by the choice of components employed for performing a particular function, the complexity of the design and the ease of manufacture and assembly of the apparatus. Since the apparatus may frequently be required to be moved from one place to another, considerations of size and weight may often be controlling in the design. The apparatus will be convenient to use if it can be operated from conventional power sources and its operation is substantially automatic. A reliable stud welding apparatus is free from potential sources of trouble and is designed to reproduce the same process each time it is employed. It is a further object of the invention to provide a stud welding apparatus for performing the method described above and characterized by a construction possessing the foregoing advantageous features.

Still other objects of the invention are to provide stud welding apparatus for performing the method described above and including a solenoid-actuated stud welding gun having a novel and improved power supply and control circuit for operating the gun to perform said method; and to provide a power supply and control circuit, as described, for converting a conventional, semi-automatic, solenoid-actuated, hand-held stud welding gun to the performance of the method of capacitor-discharge welding described.

Other objects of the invention will in part be obvious and will in part appear hereinafter.

The invention accordingly comprises the process involving the several steps and the relation and order of one or more of such steps with respect to each of the others and the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 4 is an elevation view of a typical stud useful in the method of the invention.

The present invention resides in an improved method of capacitor-discharge stud welding by which it is possible to produce stronger and more reliable welds employing studs which do not have special tips or projections for making high-resistance contact with the workpiece, which tips or projections usually have critical dimensions, are difficult and expensive to form, and are easily damaged in the course of ordinary handling. The studs employed in the method of the invention are conventional in form, having easily formed, flat or slightly concave or convex weld end surfaces having non-critical dimensions, and which are substantially immune to damage. The process is useful for welding both ferrous and non-ferrous metallic studs and dispenses with the necessity for arc shields, fluxes and inert atmospheres. Moreover, this method can be performed with conventional stud welding guns of the solenoid-actuated type adapted to be employed in processes wherein an arc is created as the stud is moved from contact with, and then toward, the workpiece; and in some respects the method resembles conventional methods of this type insofar as the stud is first lifted from, and then plunged toward, the workpiece and a low-intensity or pilot arc is created between the stud and the workpiece during lift.

Figure 3:
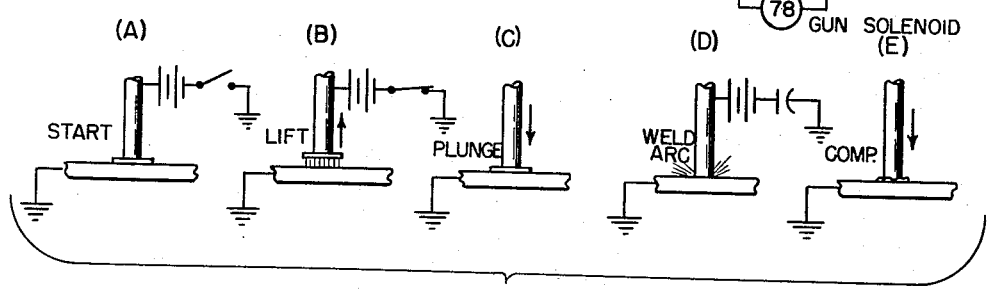
FIG. 3 is a schematic illustration of the steps in the method of the invention.

The method of the invention is illustrated basically in FIG. 3 of the drawings. The stud is initially positioned (A) with the weld end in contact with the workpiece and is then lifted (B) away from the workpiece while current of relatively low value is sent through the stud and workpiece to produce a low-intensity pilot arc, in this case of insufficient intensity to cause any appreciable melting of the stud and workpiece but sufficient to cause at least some superficial melting of adjoining portions of the stud and workpiece and roughening of the surfaces of these portions. Thereafter the stud is plunged (C) toward, and into contact with, the workpiece extinguishing the arc, and the stud is urged toward the workpiece with pressure contact therebetween. While pressure is maintained, current of high value, e.g. from a capacitor, is immediately sent (D) through the stud and workpiece to create a welding arc for melting adjoining portions of the stud and workpiece, which fuse together (E) completing the weld.

Figure 1:
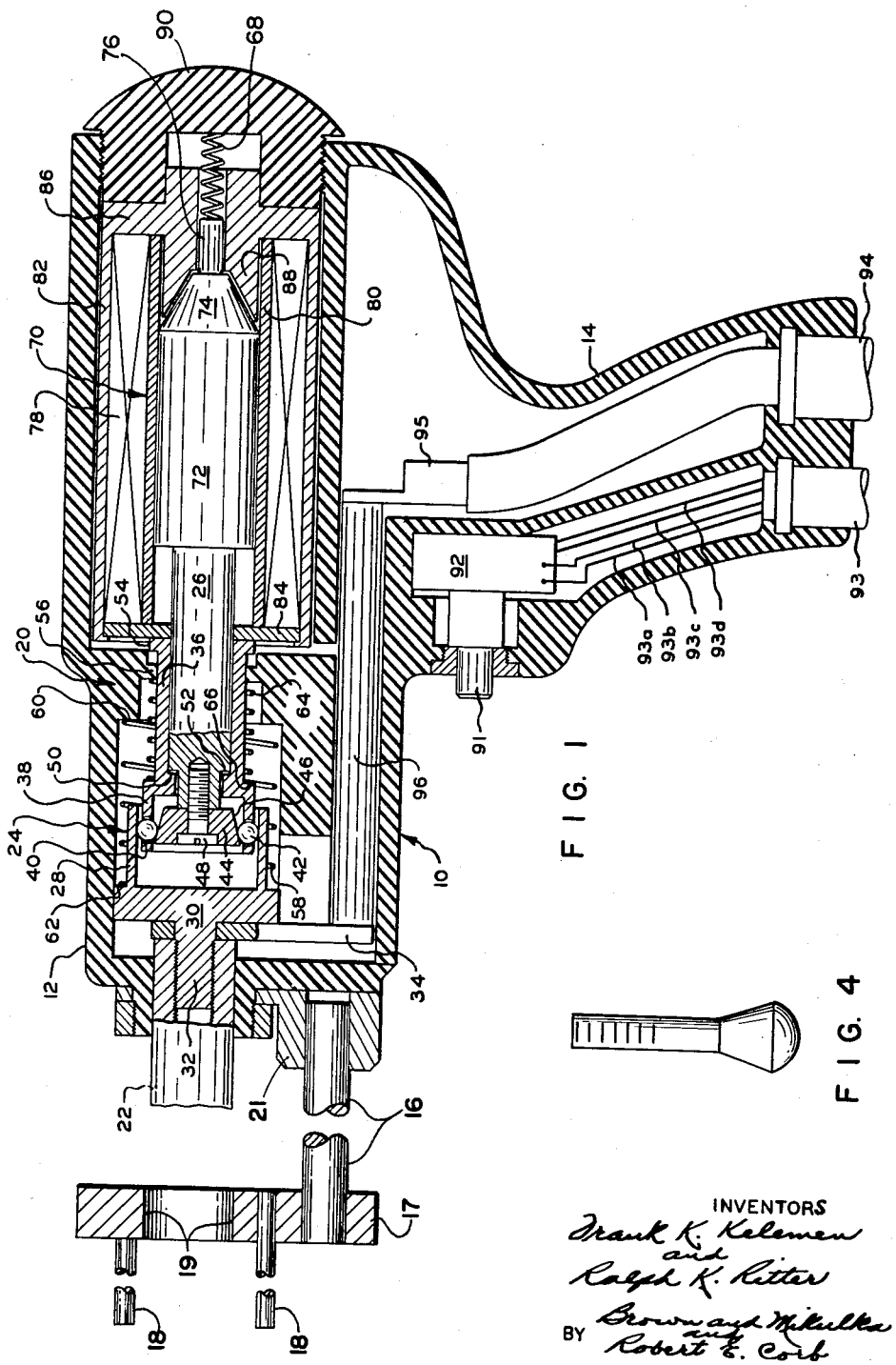
FIGURE 1 is a view, partially in section and partially in elevation, of one form of welding gun adapted for use in the method of the invention and comprising a component of the apparatus used for performing said method, the section being taken along the main longitudinal axis of the gun.

A hand-held stud welding gun of the semi-automatic piston type and comprising the apparatus used for performing the method of the invention is shown in FIG. 1 of the drawings. This gun, more fully described in U.S. Patent No. 2,796,513, issued to Frank K. Kelemen et al. on June 18, 1957, has associated with it a power supply and control circuit which renders the operation of the gun almost completely automatic, requiring only that the operator insert a stud in the chuck of the gun, properly position the stud and gun with respect to the workpiece, and then close a trigger switch on the gun while the gun is pressed toward the workpiece. The entire welding process requires but a few moments to complete, and at the end the operator merely disengages the gun from the welded stud. The welding gun shown in FIG. 1 comprises a main housing 10, preferably formed of an electrically non-conducting material such as an organic plastic. Housing 10 comprises a generally cylindrical barrel 12 and, in its preferred form, a handgrip or handle 14 and is preferably formed of two or more sections so that it can be easily disassembled to permit ready access to the operating elements contained therein. Slidably mounted in barrel 12, preferably beneath the main longitudinal axis thereof, is a leg member 16. Secured to leg member 16 is a tripod face plate 17 having three extended feet 18 symmetrically arranged around an opening 19 in the face plate, which is preferably aligned with the main longitudinal axis of the gun. Feet 18 and the position of tripod face plate 17 on leg 16 are preferably adjustable so that the gun can be positioned at any desired distance from the workpiece. A face plate 21 is provided on the gun barrel for mounting leg 16 and tripod face plate 17.

Barrel 12 is provided with a main longitudinal bore open at both ends and has an intermediate, inwardly extending section 20 which separates said bore into essentially two chambers. Slidably mounted in the front open end of said barrel are stud-holding means 22 which may comprise a chuck adaptor, a chuck and a spring and which operatively mounts the stud. The stud is fixed in the stud holder 22 so as to be movable therewith. Movably mounted in the chamber between section 20 and the front end of gun barrel 12 is a novel connecting mechanism 24 which is adapted to connect together stud holder 22 and a suitable lifting member 26. As shown, mechanism 24 comprises a ball-engaging barrel 28, which is preferably integrally formed with and extends rearwardly from a screw member 30, whose threaded shank 32 is screwed into a threaded bore provided therefor in stud holder 22. Members 30 and 22 are formed of conducting material, preferably a metal such as steel, and barrel 28 is suitably heat-treated so that the internal surface thereof has excellent wear resistance. Clamped between the forward wall of the head of screw member 30 and the end of stud holder 22 is a welding current conductor 34 which is suitably connected to the source of welding current by means to be more fully described hereinafter.

Slidably mounted for movement substantially coaxially with said stud holder 22 and lifting member 26 is a sleeve 36 biased in plunge direction and provided with a forward cylindrical portion 38 of enlarged diameter, said portion being equipped with a plurality of recesses 40 and serving as a cage to operatively mount a plurality of balls 42 in said recesses. Two balls have been shown in FIG. 1 in order to illustrate that a plurality of such balls are carried by the cage 38 and that these are equally spaced around the periphery thereof to provide a uniform distribution of the lifting forces exerted thereby when in operation. Ball cage 38 has an outer diameter which is sufficiently smaller than the internal diameter of the ball-engaging surface of barrel 28 within which it fits to preclude any appreciable surface contact, and the internal diameter of the rear portion of sleeve 36 is sufficiently larger than the external diameter of the portion of the lifting member 26, which it surrounds, to prevent any appreciable frictional engagement therebetween.

Rigidly mounted on the forward end of lifting member 26 is a ball-engaging member 44 provided with a tapered ball-engaging peripheral surface 46, the diameter of said surface decreasing in the direction of said lifting member. Member 44 may be secured to or integrally formed with lifting member 26 and, as shown, a screw 48 extending through member 44 and threaded into the end of member 26 effects the desired union between the said members.

Balls 42 are adapted to be engaged by tapered surface 46 when the latter is moved in lift direction relative to cage 38, and this engagement forces said balls rapidly outward into engagement with the internal surface of barrel 28. This tends to lock together the ball-engaging members 44 and 28 and the elements secured thereto, namely, lifting member 26 and stud holder 22, and renders mechanism 24 operative.

An internal shoulder 50 is formed in the forward end of sleeve 36 adjacent cage 38 and is adapted to engage a shoulder 52 in the forward end of member 26 to provide a stop for the movement in plunge direction of lifting member 26 relative to sleeve 36. At the rear end of sleeve 36, an outwardly extending flange 54 is provided and is adapted to engage an inwardly extending flange 56 in intermediate section 20 of the housing in its movement in plunge direction, whereby said flange 56 fixes the foremost position of sleeve 36 relative to housing 10.

A mainspring 58 is provided for normally biasing member 30 and stud holder 22 along therewith in a plunge direction. Spring 58 is held under compression between a shoulder 60 provided by intermediate section 20 of the housing and a shoulder 62 of member 30.

In a preferred form of the connecting mechanism, when shoulders 50 and 52 are in engagement, mechanism 24 is inoperative, i.e., balls 42 are inoperative to effect frictional engagement between barrel 28 and member 44. Thus, so long as shoulder 52 is held in engagement with shoulder 50, barrel 28, and hence stud holder 22, is free for movement in either direction relative to lifting member 26. A spring 64 located between internal shoulder 56 and an external shoulder 66 provided by the base of ball cage 38 normally biases sleeve 36 in a plunge direction.

A further spring 68 which exerts a sufficient biasing force upon lifting member 26 to overcome the weight thereof urges said member in a plunge direction so that normally shoulder 52 engages shoulder 50 and maintains connecting mechanism 24 inoperative.

As a means for applying a lifting force to member 26, there is provided in the gun structure, in the form shown, a solenoid 70. Lifting member 26 is the movable core of said solenoid and includes a portion 72 of enlarged diameter, a tapered portion 74 and a rear portion 76 of diminished diameter. Surrounding movable core 26 is the solenoid coil 78 which is housed in a metallic structure comprising an internal cylindrical sleeve 80, for example of brass, an external sleeve 82, for example of steel, a front plate 84, rear wall 86 and a stationary core 88. Stationary core 88, rear wall 86 and outer sleeve 82 may be integrally formed, and this integral structure is preferably provided with an internal bore that slidably receives core portion 76.

A cap member 90 is fed into the opening at the rear of gun barrel 12, said member 90 being preferably formed of an electrically nonconducting material such as, for example, the same plastic material from which the gun housing is formed. Spring 68, which biases movable core 26 in a plunge direction, is preferably mounted between the end of said reduced portion 76 of the movable core and the inner wall of cap 90. Cap 90 is preferably secured to stationary core 88 and rear wall 86 so that said cap, stationary core 88, wall 86 and sleeve 82 move as a unit. However, plate 84, inner sleeve 80 and solenoid coil 78 are free to move angularly with respect to the remainder of the solenoid housing, but are restrained by outer sleeve 82 so as to move axially along with said outer sleeve. Plate 84 abuts against one end of inner sleeve 80, and the other end of said sleeve abuts against wall 86 so that the axial position of the front surface of plate 84 is precisely fixed in the gun housing in relation to stationary core 88 of the solenoid and the axial position of plate 84 may be controlled by adjusting the position of cap member 90. By mounting plate 84 and solenoid coil 78 so that the latter are not rotated along with sleeve 82, adjustment of cap 90 leaves unaffected the electrical connections which are made to the solenoid coil through plate 84 despite the rotation of sleeve 82.

To precisely control the lift of the stud and prevent overtravel of stud holder 22 relative to lifting member 26, sleeve 36 is so formed and mounted in relation to lifting member 26 and stationary core 88 that, during the lift, the end of sleeve 36 engages plate 84 and is positively stopped thereby before the end of movable core 70 engages stationary core 88. It is to be observed that adjustment of the total lift will be obtained by adjusting the position of the plate 84 by means of cap 90, but that such adjustment does not affect the aforementioned sequence of operations because the axial position of plate 84 is fixed relative to the axial position of stationary core 88. By having sleeve 36 engage and be positively stopped before lifting member 26 engages any stops, the stopping force is transmitted through said sleeve to balls 42 in a direction which tends to augment the wedging action between the plate-engaging surfaces of elements 44 and 28.

Disposed in hand-grip 14 of the housing, in a position to be readily engaged by the finger of the gun operator, is a trigger in the form of a push-button 91 which, when depressed, is adapted to actuate a control switch 92. A pair of electrical cables 93 and 94 preferably extend through the bottom of the hand-grip into the housing to effect the necessary electrical connections. Cable 94 provides the welding current and is connected by a connector element 95 to a conducting rod 96 which, in turn, is affixed to and makes contact with conductor 34. The structure comprising conductor 34, rod 96 and connector 95 is freely movably longitudinally of gun barrel 12 along with stud holder 22, cable 94 being sufficiently flexible and having enough play in the gun handle to permit such free movement. Cable 93 carries four control wires 93A, 93B, 93C and 93D; wires 93A and 93B being connected to switch 92, and wires 93C and 93D extending upward through the gun housing to connect with solenoid coil 78 through plate 84.

The gun of FIG. 1 is shown in lift position with flange 54 engaging plate 84 and mechanism 24 locked in operative position. However, prior to movement into lift position, stud holder 22 is in its foremost position in plunge direction, being held in this position by the pressure of spring 58. Under the influence of spring 64, sleeve 36 and the balls carried thereby are also urged into their foremost position in plunge direction. Similarly, lifting member 26 is biased by spring 58 in this same direction and, as noted hereinabove and because of the engagement of shoulders 50 and 52, connecting mechanism 24 is inoperative to effect engagement between member 44 and barrel 28. In this position, therefore, stud holder 22 is free to be moved axially against the bias of spring 58. Prior to the commencement of a welding cycle by depression of trigger 91, solenoid 78 is energized to move member 26 in a lift direction while sleeve 36 continues to be biased in plunge direction by its spring 64. As a result, when lifting member 26 has moved a predetermined constant short distance in lift direction, balls 42 frictionally engage and are wedged between the surface 46 of member 44 and the internal surface of barrel 28. This locks together lifting member 26 and stud holder 22 and begins the lift of the latter. Lift is terminated when the end of flange 54 of sleeve 36 abuts against plate 84 and renders more positive the locking engagement between stud holder 22 and lifting member 26. The elements are so held as long as solenoid 78 remains energized.

Upon deenergization of the solenoid coil, stud holder 22, sleeve 36 and lifting member 26 are moved in a plunge direction under the influence of their respective springs, and the stud held by said holder is plunged into engagement with the body member.

Figure 2:
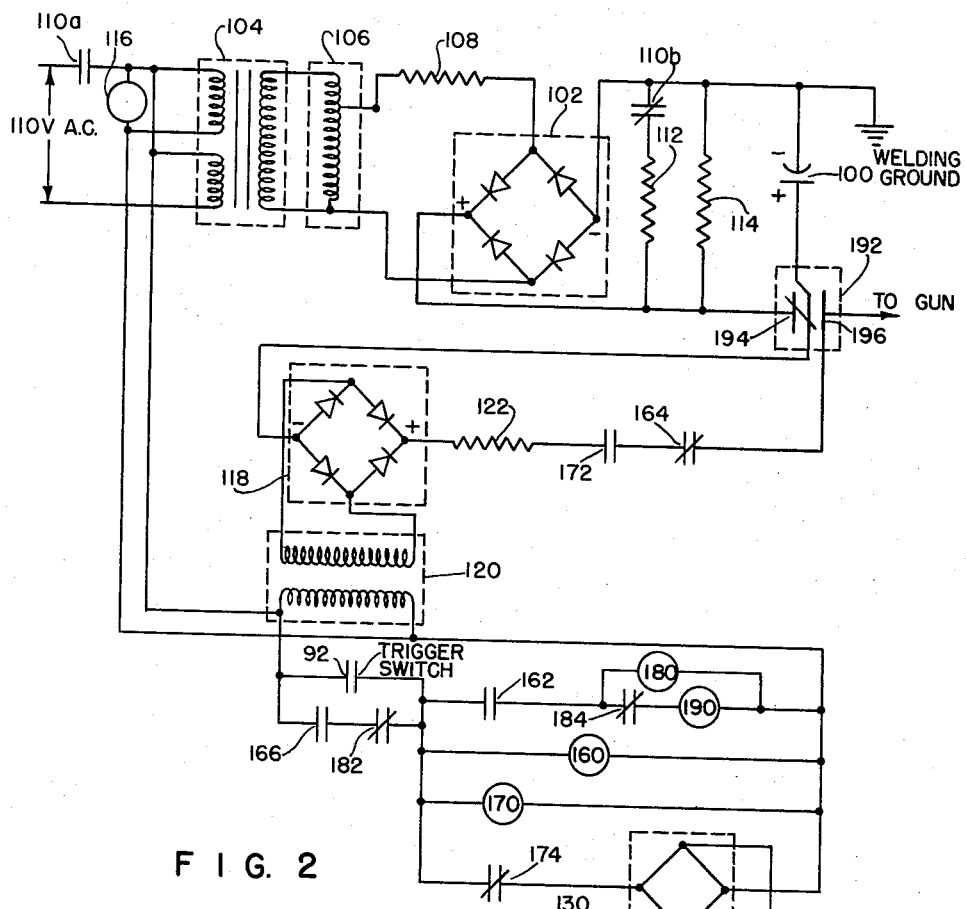
FIG. 2 is an electrical wiring diagram illustrating schematically one form of electrical circuit embodying the novel welding power supply and control system of the invention.

The stud welding apparatus of the invention includes, in combination with the welding gun described above, a novel power supply and control circuit for supplying welding current to the gun and for controlling the operation of both the gun and the welding power supply during the welding operation. Reference is now made to FIG. 2 of the drawings wherein there is illustrated a power supply and control circuit embodying the invention adapted to be powered by alternating current from a conventional source such as a 115 or 230 volt, 60 cycle source.

The welding current supply circuit includes a capacitor designated 100 for storing the current required to effect the welding of a stud to a workpiece. Charging current for capacitor 100 is provided by a full-wave bridge rectifier 102 which receives its power from an alternating current source. In order to provide power for the capacitor in a predetermined voltage range regardless of whether the circuit is connected with a 115 or 230 volt source and since it is desirable to avoid defining polarity at the power input terminals with respect to the welding current, there is provided a power transformer 104 also adapted to function to isolate the alternating current power input circuit and the control circuit from the welding current supply circuit. Power transformer 104, in the form shown, includes two primary windings which may be coupled in parallel to a 115 volt source or in series to a 230 volt source, allowing the apparatus to be employed with either of the two conventional types of power supplies. The secondary of transformer 104 is adapted to deliver current at substantially a single voltage regardless of the alternating current source employed and is connected to a continuously tapped autotransformer 106 which, being variable, is capable of supplying current for charging the capacitor within a range of voltages. Autotransformer 106 is connected to rectifier 102 through resistance 108 provided as a current limiting device to prevent damage to the rectifier caused by the initial current surge at the beginning of each charging cycle.

Rectifier 102 is connected to capacitor 100 through normally closed points 194 of the main welding contactor 192. The circuit is designed so that the capacitor starts to charge as soon as the primary of transformer 104 is connected to a source of alternating current and discharges relatively slowly when the transformer is deactivated. The power transformer is connected to an alternating power supply through normally open contacts 110a of a double-pole, double-throw switch. A resistor 112 is connected through normally closed contacts 110b of the same double-pole, double-throw switch in parallel with the rectifier and capacitor so that when contacts 110a are closed to apply alternating current potential across the primaries of transformer 104, contacts 110b are open so that charging current can flow from rectifier 102 to capacitor 100. When contacts 110a are opened, then contacts 110b are closed, allowing the capacitor to discharge through resistor 112. A pilot light 116 is connected across the primary terminals of transformer 104 to provide a visual indication as to whether the apparatus is in operation.

As previously noted, the voltage output of autotransformer 106 is variable, and accordingly, means is provided for reducing the charge carried by the capacitor in the event the potential output of the autotransformer is reduced after the capacitor has been charged to a higher value. This means comprises a relatively high resistance 114 connected in parallel with the capacitor and rectifier for continuously bleeding a small current from the charging circuit. Although the charging circuit must function continuously to maintain the charge on the capacitor because of the drain of resistance 114, the current bled by the resistance is small and the resistance is sufficient to absorb current from the capacitor when the potential across the autotranformer and rectifier is reduced below that of the capacitor.

One terminal of capacitor 100 is connected to the welding ground, and the other terminal is connected to the welding gun (and stud) through normally open points 196 of main welding contactor 192. Points 194 and 196 of the main welding contactor are so arranged that one pair is open when the other pair is closed, thereby preventing rectifier 102 from being connected directly across the stud and workpiece.

Capacitor 100 is provided primarily for supplying the main welding current, while the major portion of the low-intensity "pilot arc" current is supplied from a separate source. This source comprises a full-wave bridge rectifier 118 powered by an isolation transformer 120 connected across the primary of transformer 104 so as to provide substantially constant voltage to the rectifier. One output terminal of rectifier 118 is connected through normally closed contactor points 194 to the terminal of capacitor 100 having the opposite polarity. The other output terminal of rectifier 118 is connected through a limiting resistor 122, normally open points 172 and normally closed points 164 to the welding gun (and stud). This arrangement is such that closing of points 174 is effective to apply a potential across the gun and workpiece, representing the output of rectifier 118 supplemented by current from capacitor 100 which is only partially discharged for this purpose. It is apparent that rectifier 118 and transformer 120 could be eliminated if all of the current for the low-intensity pilot arc were supplied by capacitor 100. However, this would entail increasing the capacitance considerably, and the cost of providing such added capacitance might well be out of proportion to any benefits derived therefrom.

The control portion of the apparatus is designed to control the operation of the pilot arc, the charging and the discharging of the capacitor, and the action of the welding gun, and to coordinate the functions of these components to achieve the cycle of operation required for a stud welding process. The control circuit includes gun trigger switch 92, and connected in series therewith are a main contactor coil 190, normally open contact points 162 and normally closed contact points 184, the main contactor coil controlling the operation of points 194 and 196. Also connected in series with trigger switch 92, but in parallel with one another and coil 190 and contact points 162 and 184, are time delay relay coils 160 and 170 which control, respectively, the operation of contact points 162, 164 and 166 and 172 and 174. Similarly connected in series with one another and with trigger switch 92, and in parallel with the aforementioned branches of the circuit, are rectifier 130 and normally closed contact points 174.

As previously noted, the operation of the welding apparatus is substantially automatic insofar as the operator is concerned, requiring only that the operator close trigger switch 92 to initiate a welding cycle. The capacitor commences to charge as soon as contacts 110a are closed and 110b are opened to supply current to the welding supply and control circuit. The operator is required to insert a stud in the welding gun, place the gun in welding position with tripod feet 18 resting on the workpiece, and depress the gun trigger. The few seconds required for performing these operations are usually ample to allow complete charging of the capacitor in readiness for each welding cycle so that sufficient welding current is assured when the trigger is depressed. Upon closing of the trigger switch 92, time delay coils 160 and 170 are energized and current flows through contact points 174 to rectifier 130 which actuates solenoid 78 to move the stud in lift direction. The operation of coil 170 and contact points 172 is such that the points close instantaneously as coil 170 is energized so as to complete the pilot arc circuit through contact points 172 and 164 almost simultaneously with the commencement of lifting movement of the stud and thereby cause a low-intensity pilot arc to be drawn between the stud and workpiece. After a predetermined delay, time delay coil 170 causes contacts 174 to open, discontinuing the flow of current to rectifier 130 and solenoid 78 and allowing the stud to move in plunge direction toward and into contact with the workpiece to extinguish the pilot arc. The flow of current for the pilot arc may continue for a short time after the stud has been returned to the workpiece and the pilot arc has been extinguished, but is terminated when time delay coil 160 causes contacts 164 to open and interrupt the flow of current between rectifier 118 and the gun. Following return of the stud to the workpiece, time delay coil 160 causes contacts 162 to close, completing the circuit through main contactor coil 190 which, when energized, closes the main contactor points 196 for allowing current from capacitor 100 to flow directly through the stud and workpiece rapidly discharging the capacitor and creating the main welding arc.

A trigger interlocking means is provided for preventing interruption of the welding cycle due to the opening of trigger switch 92 prior to completion of a welding cycle and includes normally open contact points 166 and normally closed contact points 182 connected in series across trigger switch 92 for bypassing the latter. A time delay coil 180 is provided in parallel with main contactor coil 190 and contact points 184 for controlling the operation of contact points 182 and 184. The operation of contact points 166 is substantially instantaneous when coil 160 is energized at the commencement of a welding cycle, thereby immediately bypassing trigger switch 92.

The welding cycle is terminated by the time delay coil 180 connected in parallel with contact points 184 and main contactor coil 190 so as to be energized by the closing of contact points 162. When time delay coil 180 times out, it opens contact points 184, interrupting the flow of current to main contactor coil 190, resulting in the opening of main contacts 196 and the closing of contacts 194, thereby allowing the capacitor to commence recharging. This arrangement is such that, as long as the operator depresses the trigger, even though the welding cycle is completed, time delay coils 160 and 170 remain energized, holding contact points 164 and 174 open so that no current can flow through the pilot arc circuit or the gun solenoid, while at the same time the capacitor is allowed to commence recharging when the welding cycle is complete. Contact points 132 are provided in the trigger interlock in order to allow for return of the control elements to their normal positions shown in FIG. 2 when the trigger is released in order to allow for recycling of the apparatus. Contact points 182 open when coils 180 times out, thereby opening the trigger interlock circuit when the welding cycle is completed and allowing the control elements to return to their normal positions in readiness to perform another welding cycle.

The timing of the various control elements is such that the flow of current for the low-intensity pilot arc is initiated simultaneously with the flow of current to the solenoid to cause lifting movement of the stud. The flow of pilot arc current is terminated shortly after the solenoid is deenergized so that the pilot arc is maintained at least during plunge of the stud so that it is the contact between the stud and workpiece which extinguishes the arc. Thereafter, current from the capacitor is sent through the stud and workpiece to create the welding arc. Except for maintaining this particular sequence of operations, the actual times are not critical and can be varied to suit the size, type and material of the particular stud to be welded. By way of example, good results were obtained using 10–32 bulbous-end aluminum studs of the type illustrated in FIG. 4 of the drawings under the following conditions.

Capacitance____ 105,000 mfd. at approximately 150 v. D.C.
Pilot arc current 230 v. D.C.
Lift_____ .020 inch.
Plunge_____ .125 inch.
Limiting resistor 10 ohms.

| Time delay coil No.: | Delay, cycles |
| --- | --- |
| 160 | 30 |
| 170 | 25 |
| 180 | 10 |

Since certain changes may be made in the above process and apparatus without departing from the scope of the invention herein involved, it is intended that all matter contained in the above description or shown in the accompanying drawings shall be interpreted as illustrative and not in a limiting sense.

What is claimed is:

1. The method of welding a stud to a workpiece comprising positioning a portion of said stud in contact with said workpiece; passing electrical current through said stud and workpiece while displacing said stud away from said workpiece to create a low-intensity arc between said stud and workpiece; said arc being of sufficient intensity and duration to alter the character of said portion of said stud; moving said stud toward said workpiece into contact therewith for extinguishing said arc between said stud and workpiece; and immediately following contact of said stud with said workpiece and while said stud is urged toward said workpiece, sending welding current of high value through said stud and workpiece for melting adjoining portions thereof, the alteration of said character constituting roughening.

2. The method of stud welding as defined in claim 1 wherein the flow of current for said low-intensity arc is discontinued immediately as said stud contacts said workpiece and said arc is extinguished and prior to the initiation of the flow of said welding current.

3. The stud welding method as defined in claim 1 wherein the flow of current for said low-intensity arc is continued until said welding current is set through said stud and workpiece.

4. The stud welding method as defined in claim 1 wherein the flow of current for said low-intensity arc is discontinued between the time of contact of said stud and workpiece and the commencement of flow of said welding current.

5. The stud welding method as defined in claim 1 wherein said welding current is sent through said stud and workpiece substantially simultaneously with contact of said stud and workpiece and the extinguishing of said low-intensity arc therebetween.

6. The method of welding a stud to a workpiece comprising positioning a portion of said stud in contact with said workpiece; simultaneously sending electrical current through said stud and workpiece and displacing said stud away from said workpiece to create a low-intensity arc between said stud and workpiece; maintaining the flow of said current through said stud and workpiece while removing said stud toward said workpiece into contact therewith for extinguishing said arc between said stud and workpiece; said arc being of sufficient intensity and duration to alter the character of said portion of said stud; immediately following contact of said stud with said workpiece and while holding said stud in pressure contact with said workpiece, discharging a capacitor through said stud and workpiece to produce an intense arc for melting adjoining portions thereof; and thereafter holding said stud and workpiece in pressure contact until the molten portions thereof fuse together to complete the weld, the alteration of said character constituting superficial melting.

7. The method of stud welding defined in claim 6 wherein the flow of current for said low-intensity arc is discontinued immediately as said stud contacts said workpiece and said arc is extinguished and prior to the initiation of the flow of said welding current.

8. The stud welding method as defined in claim 6 wherein the flow of current for said low-intensity arc is continued until said welding current is sent through said stud and workpiece.

9. The stud welding method as defined in claim 6 wherein the flow of current for said low-intensity arc is discontinued between the time of contact of said stud and workpiece and the commencement of flow of said welding current.

10. The stud welding method as defined in claim 6 wherein said welding current is sent through said stud and workpiece substantially simultaneously with contact of said stud and workpiece and the extinguishing of said low-intensity arc therebetween.

11. The method of welding a stud to a workpiece, said stud having a weld end surface which is substantially free of projections and irregularities, which method comprises positioning said stud with said weld end surface in contact with said workpiece; passing electrical current through said stud and said workpiece while displacing said stud away from said workpiece to create a low-intensity arc between said weld end surface of said stud and said workpiece; moving said stud toward said workpiece into contact therewith for extinguishing said arc between said stud and workpiece; said arc being of sufficient intensity and duration to alter the physical character of said weld end surface; and immediately following contact of said stud with said workpiece and while said stud is urged toward said workpiece, sending welding current of high value through said stud and workpiece for melting adjoining portions thereof, the alteration of said physical character constituting roughening.

12. The method of welding a stud to a workpiece, said stud having a weld end surface which is substantially free of projections and irregularities, said method comprising positioning said stud with said weld end surface in contact with said workpiece; simultaneously sending electrical current through said stud and workpiece and displacing said stud from said workpiece to create a low-intensity arc between said weld end surface of said stud and said workpiece; maintaining the flow of said current through said stud and workpiece while moving said stud toward said workpiece into contact therewith for extinguishing said arc; said arc being of sufficient intensity and duration to alter the physical character of said weld end surface immediately following contact of said stud with said workpiece and while holding said stud in pressure contact with said workpiece, discharging a capacitor through said stud and workpiece to produce an intense arc for melting adjoining portions thereof; and thereafter holding said stud and workpiece in pressure contact until the molten portions thereof fuse together to complete the weld, the alteration of said physical character constituting superficial melting.

13. The method of welding a stud to a workpiece comprising positioning said stud in contact with said workpiece; sending current through said stud and workpiece and substantially simultaneously displacing said stud away from said workpiece for creating an arc therebetween of sufficient intensity and duration to cause superficial melting of adjoining portions of said stud and workpiece; moving said stud toward said workpiece into contact therewith and extinguishing said low-intensity arc; and immediately following contact of said stud with said workpiece and while said stud is urged toward said workpiece, sending a surge of welding current of high value through said stud and workpiece for melting adjoining portions thereof.

14. The method of welding a stud to a workpiece employing apparatus including a solenoid for displacing said stud from said workpiece and resilient means for biasing said stud toward said workpiece, said method including the steps of positioning said apparatus with a portion of said stud in pressure contact with said workpiece; energizing said solenoid for displacing said stud away from said workpiece while passing electrical current through said stud and workpiece to create a low-intensity arc therebetween; discontinuing the flow of current to said solenoid to allow the latter to return to said workpiece under the bias of said resilient means and thereby extinguish said arc between said stud and workpiece when contact is made; said arc being of sufficient intensity and duration to alter the character of said portion of said stud immediately following contact of said stud with said workpiece, sending a surge of welding current of high value through said stud and workpiece for melting adjoining portions thereof; and continuing to urge said stud toward said workpiece into pressure contact therewith until the molten portions of said stud and workpiece fuse together to complete the weld, the alteration of said character constituting roughening.

15. The method of welding a stud to a workpiece comprising positioning said stud in contact with said workpiece; displacing said stud away from said workpiece while creating a low-intensity arc therebetween for superficially melting adjoining portions of said stud and workpiece; supplying current for said low-intensity arc by connecting said stud and workpiece across a source of direct current while partially discharging a capacitor through said stud and workpiece; maintaining said stud displaced from said workpiece for a predetermined period; at the end of said period, moving said stud into contact with said workpiece for extinguishing said low-intensity arc; the intensity and duration of said low-intensity arc being such that said melting is accompanied by roughening; and immediately following contact of said stud with said workpiece and while urging said stud into pressure contact with said workpiece, rapidly discharging said capacitor through said stud and workpiece for melting adjoining portions thereof.

16. In a stud welding apparatus comprising a welding device including stud-holding means, resilient means for urging said stud-holding means toward a workpiece and a solenoid for moving said stud-holding means against the bias of said resilient means away from said workpiece, the combination with said device of welding current supply means and control means for operating said device and said welding current supply means to effect a welding cycle; said welding current supply means including a first source of direct current, capacitor and a second source of direct current for charging said capacitor; said control means including means for supplying current to said solenoid for moving a stud held in said stud-holding means away from said workpiece, means for connecting said stud-holding means, said workpiece, said capacitor and said first direct current source in series substantially simultaneously with the commencement of movement of said stud away from said workpiece for creating a low-intensity arc between a portion of said stud and said workpiece, first timing means for interrupting the flow of current to said solenoid at the end of a predetermined period to allow said stud to return to contact with said workpiece, said flow of current being of sufficient intensity and said period being of sufficient duration to change the character of said portion of said stud, and extinguish said low intensity arc, and means including second timing means for connecting said capacitor directly across said stud and workpiece for discharging said capacitor therethrough for melting adjoining portions thereof after said stud has contacted said workpiece, the change of said character constituting superficial melting.

17. In a stud welding apparatus comprising a welding device including stud-holding means, means including a solenoid for moving said stud-holding means away from a workpiece and resilient means for moving said stud-holding means toward said workpiece, the combination with said device of welding current supply means and control means for operating said device and said welding current supply means to effect a welding cycle; said welding current supply means including a full-wave bridge rectifier for supplying direct current, a capacitor, one output terminal of said rectifier being connected to the terminal of opposite polarity of said capacitor, the other terminal of said capacitor being connected to said workpiece, and another source of direct current for charging said capacitor; said control means including means for supplying current to said solenoid for moving a stud held in said stud-holding means away from said workpiece, means for connecting the other output terminal of said rectifier through a limiting resistor to said stud substantially simultaneously with the commencement of movement of said stud away from said workpiece for creating a low-intensity arc between a portion of said stud and workpiece, first timing means for interrupting the flow of current to said solenoid at the end of a predetermined period to allow said stud to return to contact with said workpiece and extinguish said low intensity arc, said low intensity arc being of sufficient intensity and duration to change the character of said portion of said stud, and means including second timing means for connecting the first-mentioned capacitor terminal directly to said stud for discharging said capacitor through said stud and workpiece to melt adjoining portions thereof after said stud has contacted said workpiece, the change of said character constituting roughening.

18. The stud welding apparatus of claim 17 wherein said second timing means includes means for simultaneously opening the circuit between said other source of direct current and said capacitor and connecting said first-mentioned capacitor terminal directly to said stud.

19. In a stud welding apparatus comprising a welding device including stud-holding means, resilient means for urging said stud holding means toward a workpiece, and a solenoid for moving said stud-holding means away from said workpiece against the bias of said resilient means, the combination with said device of welding current supply means and control means for operating said device and said welding current supply means to effect a welding cycle; said welding current supply means including a first source of direct current, a capacitor and a second source of direct current for charging said capacitor; said control means including means for supplying current to said solenoid for moving a stud held in said stud-holding means away from said workpiece; first time delay means including contacts operable instantaneously when said first time delay means is energized for connecting said first direct current source across said stud-holding means and said workpiece substantially simultaneously with the commencement of movement of said stud away from said workpiece for creating a low-intensity arc between a portion of said stud and workpiece, said first time delay means including switch means for interrupting the flow of current to said solenoid at the end of a predetermined period to allow said stud to return to contact with said workpiece; second time delay means energized simultaneously with said first time delay means and including first switch means for opening the circuit including said first direct current source and said stud-holding means to discontinue the flow of current for said low-intensity arc at the end of a predetermined period exceeding the first-mentioned predetermined period and second switch means for energizing relay means at the end of said second predetermined period; said low intensity arc being of sufficient intensity and duration to change the character of said portion of said stud; said relay means including first normally open contacts connected in series with said capacitor, said stud-holding means and said workpiece and adapted to close when said relay is energized for discharging said capacitor through said stud and workpiece; and third time delay means energized by closing of said second switch means and including switch means operative at the end of a predetermined period for interrupting the flow of current to said relay means, the change of said character constituting superficial melting.

20. The stud welding apparatus of claim 19 wherein said relay means includes second normally closed contacts connecting said capacitor to said second source of direct current, said second contacts being opened and closed simultaneously with, respectively, the closing and opening of said first contacts.

21. The stud welding apparatus of claim 19 wherein said first direct current source comprises a full-wave bridge rectifier having one output terminal connected to the terminal of opposite polarity of said capacitor and having its other output terminal connected in series with a limiting resistance, said first switch means and said stud-holding means; the other terminal of said capacitor being connected to said workpiece.

22. The stud welding apparatus of claim 21 wherein said relay means includes second normally closed contacts connecting said capacitor to said second source of direct current, said second contacts being operative simultaneously with said first contacts and oppositely thereto for allowing said capacitor to be charged from said second source of direct current when said first contacts are open and no current is being drawn from said capacitor.

References Cited in the file of this patent

UNITED STATES PATENTS

| | | |
|---|---|---|
| Re. 24,832 | Shoup et al. | May 31, 1960 |
| 1,373,054 | Chubb | Mar. 29, 1921 |
| 2,231,317 | Bernard | Feb. 11, 1941 |
| 2,847,557 | English | Aug. 12, 1958 |
| 2,932,725 | Ainsworth et al. | Apr. 12, 1960 |